United States Patent [19]

Strom

[11] Patent Number: 5,419,444

[45] Date of Patent: May 30, 1995

[54] LOW PROFILE PUSH-BACK RACK ASSEMBLY

[75] Inventor: Hubert H. Strom, Fort Worth, Tex.

[73] Assignee: Inca Metal Products Corporation, Lewisville, Tex.

[21] Appl. No.: 151,421

[22] Filed: Nov. 12, 1993

[51] Int. Cl.[6] ............................................. A47F 5/00
[52] U.S. Cl. .................................. 211/151; 211/59.2; 414/276
[58] Field of Search ............... 211/151, 59.2; 414/276, 414/286

[56] References Cited

U.S. PATENT DOCUMENTS

| | | | |
|---|---|---|---|
| 4,234,069 | 11/1980 | Seiz et al. | 193/35 |
| 4,341,313 | 7/1982 | Doring | 211/151 |
| 4,462,500 | 7/1984 | Konstant et al. | 211/151 |
| 4,482,066 | 11/1984 | Dykstra | 211/151 |
| 4,613,270 | 9/1986 | Konstant et al. | 414/276 |
| 4,687,404 | 8/1987 | Seiz et al. | 414/276 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,982,851 | 1/1991 | Konstant | 211/151 |
| 4,988,251 | 1/1991 | Kinney | 414/276 |
| 5,080,241 | 1/1992 | Konstant | 211/151 |
| 5,117,990 | 6/1992 | Krummell et al. | 211/151 |
| 5,137,159 | 8/1992 | Collins et al. | 211/151 |
| 5,141,118 | 8/1992 | Gay | 211/151 |
| 5,170,896 | 12/1992 | Konstant | 211/151 |
| 5,180,069 | 1/1993 | Krummell et al. | 211/151 |
| 5,184,738 | 2/1993 | Allen | 211/151 |
| 5,203,464 | 4/1993 | Allen | 211/151 |
| 5,348,169 | 9/1994 | Allen | 211/151 |

*Primary Examiner*—Robert W. Gibson, Jr.
*Attorney, Agent, or Firm*—Harris, Tucker & Hardin

[57] ABSTRACT

A three-deep low profile push-back rack maximizes head space in a vertically stacked series of storage bays. A first pair of tracks extends longitudinally through the bays supported by the rack. The middle bay contains a second pair of tracks parallel to the first tracks. The second tracks are spaced apart a distance which is greater than the spacing of the first tracks and are mounted on the outside of the first tracks. A first flat pallet truck rolls along the first track. A lower second cart having a U-shaped frame has a front pair of wheels rolling on the first track and a pair of rear wheels rolling on the second track so that a clear nesting space is provided within the center of the frame of the lower second can to accept and receive the higher first cart. A low profile is provided to maximize head space because the frame of the higher cart does not have to roll over the top of the second cart, it only has to fit within the nesting area slightly above the loading surface of the lower cart.

22 Claims, 3 Drawing Sheets

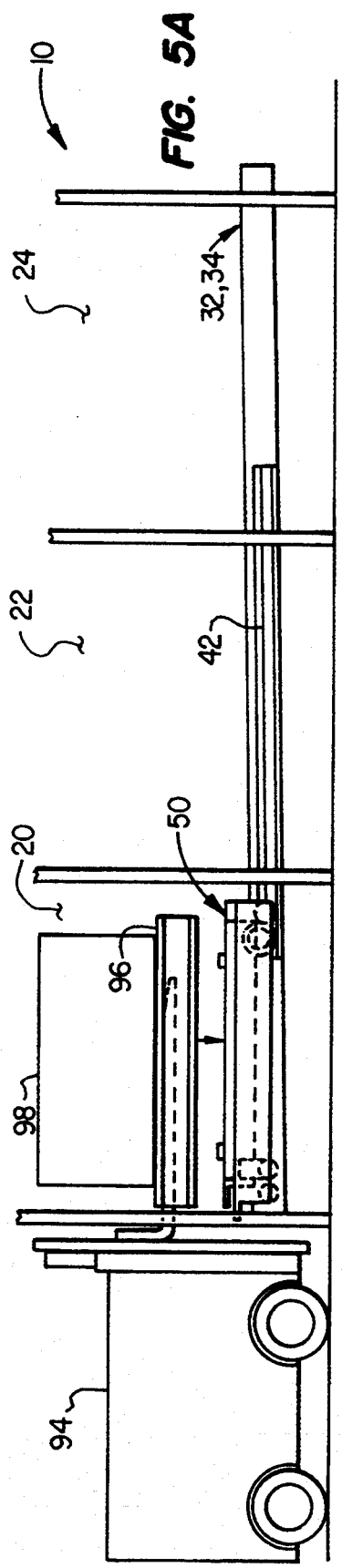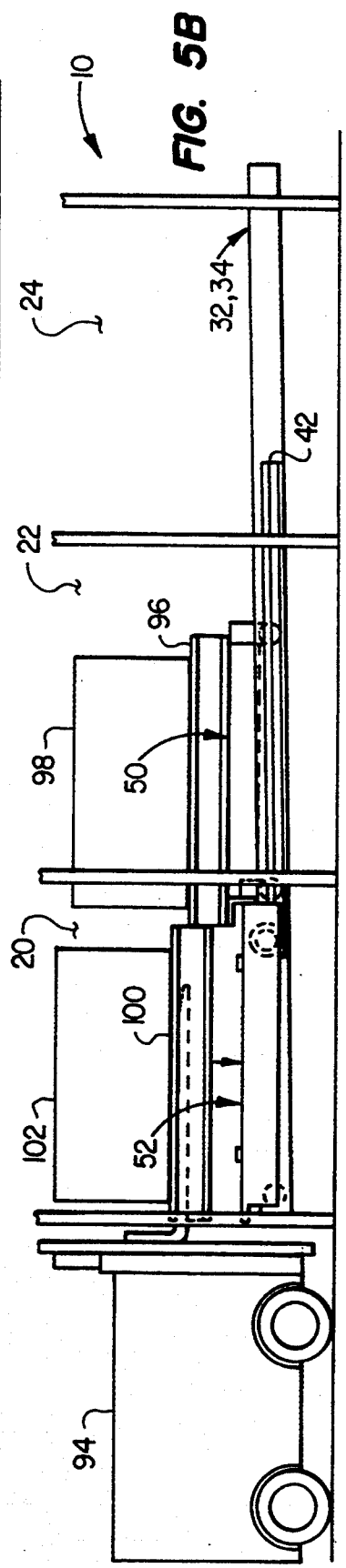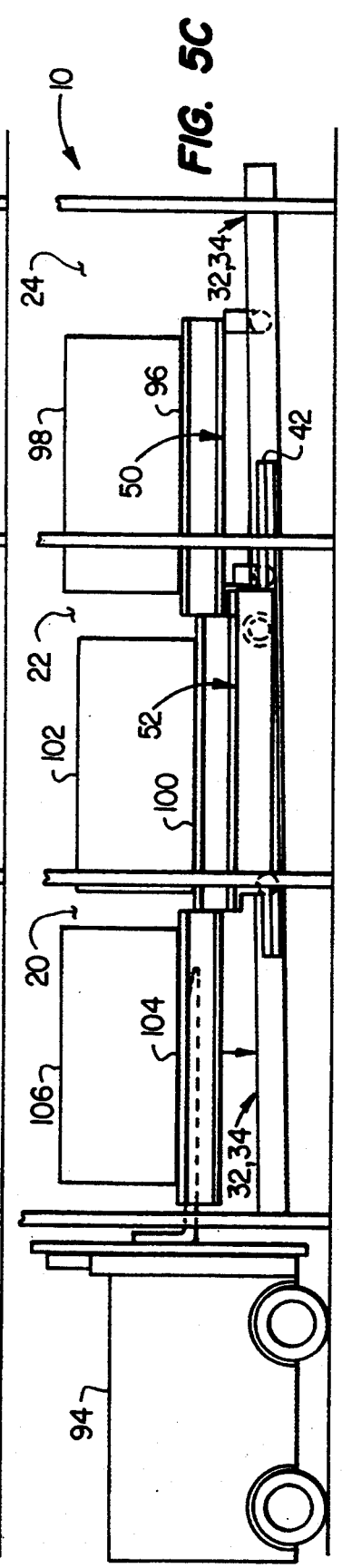

LOW PROFILE PUSH-BACK RACK ASSEMBLY

BACKGROUND OF THE INVENTION

1. Field of the Invention

The invention is in the field of push-back storage racks and, more particularly, a low profile push-back storage rack assembly.

2. Background of the Prior Art

Push-back racks exist in the prior art to store palletized loads which are handled by fork trucks from a central aisle. The racks generally extend laterally from both sides of an aisle and may be installed adjacently side by side. The racks themselves generally have vertical posts and lateral cross-members which may be arranged to define at least three-deep compartments or bays which are conveniently referred to respectively as a first bay, a second bay and a third bay. The bays or compartments are suitably sized to accommodate palletized cargo. Typically, the bays are vertically stacked by extending the rack vertically, usually four to six sets of bays high. The limiting factors are the height of the warehouse clear space and the lifting height which can be reached by the fork trucks.

There is at least one pair of rails in each compartment which extend longitudinally throughout at an inclination toward a common loading and unloading side. The rails are spaced apart to accommodate at least two flat pallet carriages or carts of different heights, the higher of the carriages or carts being adapted to roll completely over the lower carriage or cart. Both carts come to rest in the first bay.

This makes it possible to load and unload each compartment or bay from the front of the rack. If the compartments are empty, the carriages roll forwardly along the inclined rails to rest against a stop. Then a pallet can be placed on the higher carriage or cart. A fork-lift truck then lifts another pallet somewhat above the level of the loading surface of the lower cart. The pallet held by the fork-lift truck is pushed against the side of the pallet which had previously been loaded on the first cart. As the fork-lift moves forward, the second pallet pushes the first loaded pallet back to the middle or intermediate bay and the pallet and load on the forks are moved into the first bay and lowered onto the second can. Now the first and second bays contain loaded pallets.

A third pallet can be introduced by lifting it somewhat above the level of the pair of rails and then pushing it into the first compartment whereby the side of the third pallet or its load pushes against the side of the second loaded pallet. As the fork-lift truck pushes the third pallet into the first bay, the other two previously loaded pallets roll on their cans back into the second and third bays, and the third pallet is lowered onto the rails. Since the third pallet now occupies the first bay, it prevents the loaded cans from moving forward, and storage is provided for all three pallets within the rack. Unloading is accomplished in reverse order by removing the pallet from the first bay which allows the pallet in the second bay to roll on its cart to the first bay and the pallet in the third bay to roll on its cart to the second bay. Thus the compartments are located sequentially in order and unloaded in reverse order. Additional rails can be added with additional carts in various combinations to provide for more than three compartments deep with more than two cans.

In order to function, the prior art carts must be configured so that the higher first cart can freely roll completely over the lower second cart so that they can both rest one above the other in the first compartment to be loaded and unloaded. The carts, their wheel structure and the rails must be durable and capable of handling heavy pallet loads. Additional compartments with another set of supporting cross-members, rails and carts are stacked directly over the lower compartments or bays. The height of the carts in the compartment below affects head space which is required to load and unload pallets. Head space may be considered the clear vertical space between the top surface of the highest cart in the first bay and the undersurface of the cross-members immediately above the higher cart.

Head space is important in several ways. There must be enough space provided to accommodate the largest load to be manipulated by the fork truck within the confines of the first compartment. The fork-lift operator must be able to lift and place the pallets on the carts without the load coming into contact with the cross-members above. This necessitates elevating the cross-members of the second story row of compartments a certain height above the first row of compartments and similarly placing the cross-members of the third vertically stacked row of compartments above the height of the highest cart positioned thereunder. More elevation is required the greater the height of the carts stacked in the front bay. The effect is cumulative.

Fork-lift trucks are limited in their vertical lifting elevation. The forks can go only so high. The number of vertically stacked rows of compartments can be limited because the fork-lift may not be able to raise the pallet high enough to clear the highest cart in the uppermost first compartment. This can lead to a loss of a whole row of compartments, depending upon how much additional vertical height is occupied by each set of stacked carts. In addition to that problem, the warehouse itself may have girders, piping or other obstructions which limit the overall maximum vertical height, which itself can limit the number of rows that can be vertically stacked if the carts are stacked too high above the rails.

SUMMARY OF THE INVENTION

A low profile three-deep push-back rack assembly is described for multiple row stacking with efficient use of vertical space. There are rows of three storage bays arranged adjacently from front to back in a rack structure. A first bay is at the front of the rack structure, and a third bay is at the back of the rack structure with an intermediate second bay in the middle between the first and third bays. A second set of storage bays in a row, comprising fourth, fifth and sixth storage bays, are vertically elevated above the first, second and third storage bays, and at least a third set of vertically elevated storage bays in a row, comprising seventh, eighth and ninth storage bays are respectively vertically elevated above the fourth, fifth and sixth storage bays. There may be additional rows of bays above these.

The rack comprises spaced apart vertical posts and horizontal cross-members extending laterally between the posts in spaced vertical orientation, to provide support for a separate track and cart system positioned within each row of bays. The invention will be described with respect to the first, second and third ground level bays with the understanding that the additional vertically elevated bays are the same.

First spaced inwardly facing opposed parallel tracks have rolling wheel flanges for wheeled carts mounted in rolling relation with the flanges. The first tracks are inclined from front to rear, extending through the first, second and third storage bays. Second spaced outwardly facing parallel tracks have rolling wheel flanges for wheeled carts mounted in rolling relation with the flanges. The second tracks are inclined from front to rear and extend through at least the second bay.

There are two carts in each row of bays. A first flat pallet cart is mounted in rolling relation with flanges of the first spaced inwardly facing tracks, being capable of rolling along the track for positioning within any of the first, second or third storage bays. A second flat pallet cart is mounted in rolling relation with flanges of the second spaced outwardly facing tracks, being capable of rolling along the second tracks for positioning within the first or second storage bays. The second flat pallet cart has an open frame open at the back, having a front and spaced apart side to define a nesting area within the frame. The first flat pallet cart is higher than the second flat pallet cart and narrow enough in the space between the sides of the second cart so that the second cart can nest within the nesting area within the frame of the second cart whereby both of the carts may be simultaneously positioned in the first storage bay for loading and unloading.

This arrangement makes it possible for the loading surface of the higher first cart to be only slightly higher than the loading surface of the second cart, which results in a low profile push-back rack assembly. All that is necessary is that there be enough clearance so that when an ordinary pallet is placed on the loading surface of the higher first cart, it does not also come in contact with the loading surface of the lower second cart.

The frame of the first cart is supported in rolling relation with the rolling wheel flanges by sets of front and rear wheels rolling on the flanges of the spaced apart parallel first tracks. The frame of the second flat pallet cart has sets of front and rear wheels which support the second cart in rolling relation with the first track by front wheels riding on the rolling wheel flanges of the first track. The set of rear wheels of the second cart are supported in rolling relation with rolling wheel flanges of the spaced apart parallel second tracks whereby the first cart is supported in rolling relation with the first tracks and the second cart is supported in rolling relation by both of said tracks.

Since only the rear wheels of the second cart roll on the outwardly facing parallel second tracks, the second tracks may terminate short of the first inwardly facing parallel tracks. The second tracks may terminate short of both ends of the first inwardly facing parallel tracks and extend only slightly beyond the longitudinal extent of the second bay. Less material is required because the second tracks need not extend throughout the full length of all three bays. The first tracks are preferably opposed C-shaped channel beams mounted with the web of the channel vertical, the lower flanges of the channel beam serving as the rolling wheel flanges. The rolling wheel flanges of the second outwardly facing parallel tracks are provided by mounting an angle section along the back of the vertical web of each of the channel beams.

Since both sets of wheels of the first cart and the front wheels of the second cart roll on the lower flanges of the C-shaped channel beams comprising the first tracks, they are rolling just above the level of the cross members upon which the tracks rest. The rear wheels of the second cart ride on the outwardly extending flange of the second track at a slightly higher elevation than the elevation of the lower flange of the C-shaped channel beam. The frame of the first cart is elevated by placement of the wheels so that it is slightly above the frame of the second cart. This elevation may be $\frac{3}{4}''$ or less.

This combination provides a low profile closely packed nesting arrangement which maximizes the head space above the higher cart by minimizing the space between the lower cross-members in the bays and the upper loading surface of the higher cart. The clear distance is thus maximized, which makes it possible to place the next row of bays at a lower elevation above the floor than otherwise would be possible. The second cart may be said to have a U-shaped frame defining a flat pallet surface. The opened part of the U-shaped frame extends toward the second bay to define an open nesting area for receiving the first cart in nesting relation within the frame whereby both carts may be positioned in the front bay. Since the higher first cart does not have to roll over any portion of the lower second cart, the thickness of the frame of the higher first cart is not a factor which increases the height of the nesting carts. All that is required is that the first cart fit between the arms which form the sides of the U-shaped second cart. The relative height of the loading surface of the carts with respect to the height of the sets of front and rear wheels is arranged to provide a loading surface that is level, even though the tracks are inclined.

A special wheel construction, in combination with the naturally angled rolling surfaces of the first track, advantageously promotes easy assembly and disassembly of the wheels and carts. An unflanged wheel having an angled outer rolling surface is angled to cooperate in rolling relation with the flanges of the first tracks. Internal bearings in the wheels surround a rolling axis and support a load-beating shaft extending from the side of the wheels. The load-bearing shaft has an outer portion having threads for a nut which can be used to fix the shaft to the frame of the cans. The shaft has an outer end portion having facets which can be traversed by an opening in the fastening nut whereby the facets can be used to keep the shaft from turning while the nut is tightened or loosened on the shaft against the frame of the cart. The angled surfaces of the wheels and tracks tend to cause each wheel to ride laterally toward the center of the bay, thus producing a self-centering action as the wheels ride on the C-shaped channel.

BRIEF DESCRIPTION OF THE DRAWINGS

FIG. 5A is a side elevation showing a pallet being loaded in the first bay on the higher first cart;

FIG. 5B shows a second pallet being loaded in the first bay on the second cart while pushing the first loaded pallet into the second storage bay;

FIG. 5C shows a third pallet being loaded on the tracks in the first bay while pushing the first loaded pallet into the third bay and the second loaded pallet into the second bay.

DETAILED DESCRIPTION OF THE INVENTION

Figure 1:
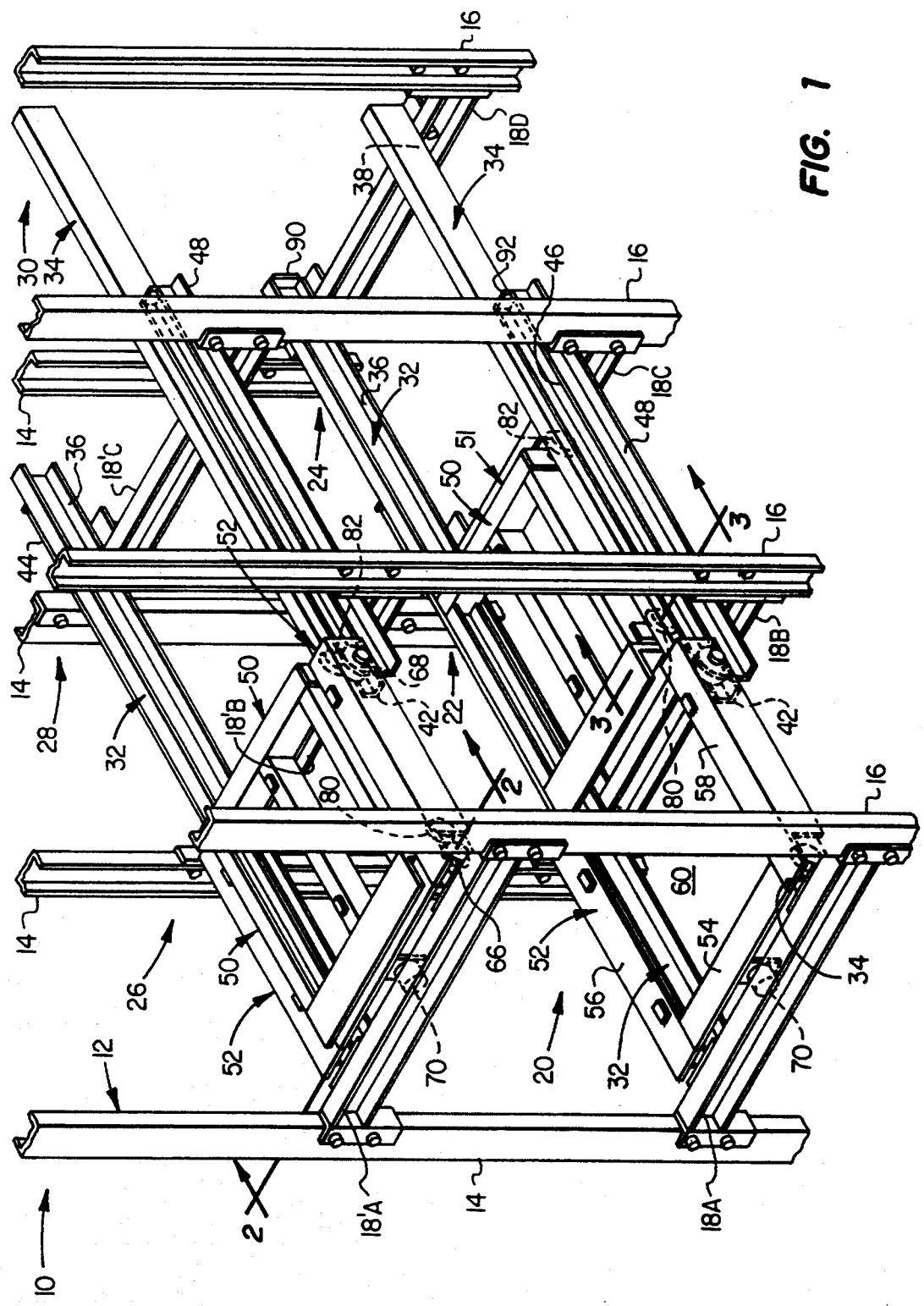
FIG. 1 is a perspective view of a low profile push-back rack assembly showing the ground level row of first, second and third bays and a part of the second row of bays elevated vertically above the first row of bays.
Figure 2:
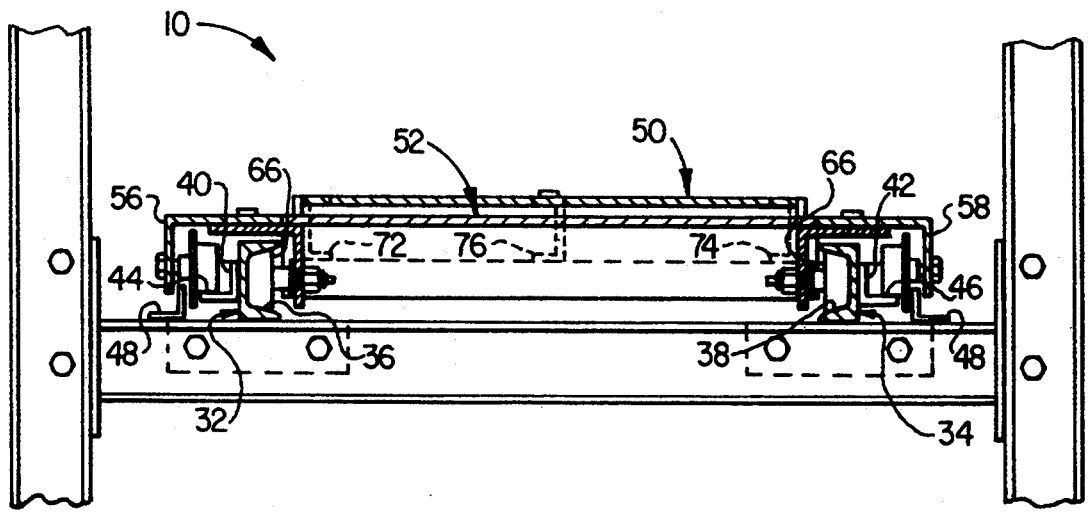
FIG. 2 is a transverse elevation view on line 2—2 of FIG. 1, showing the carts and tracks mounted on a cross-member between posts.
Figure 3:
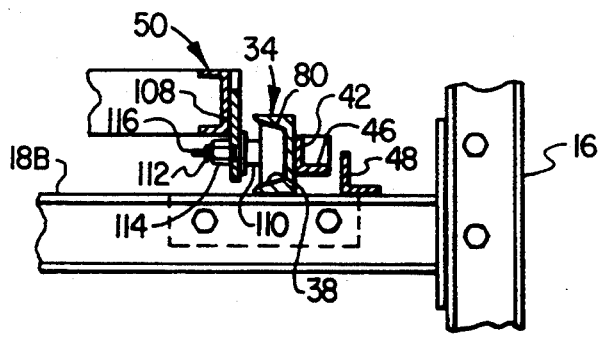
FIG. 3 is a cut-away transverse elevation view on line 3—3 of FIG. 1 showing one end of a front wheel of the first cart.
Figure 4:
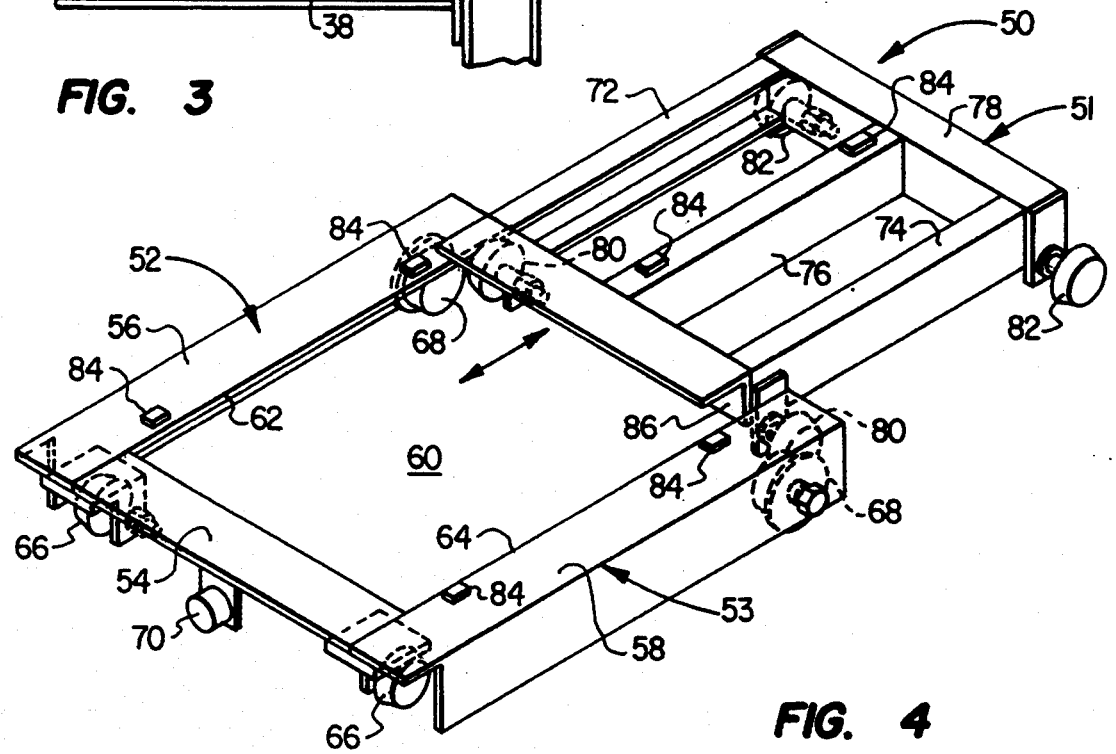
FIG. 4 is a perspective view showing the nesting configuration of the first and second cans without the tracks.

A three-deep low profile push-back storage rack assembly disclosing a specific embodiment of the invention is found in FIGS. 1 and 5 A–C. Details of the carts and tracks are shown in FIGS. 2–4. The supporting storage rack is generally designated by the reference numeral 12. It has a plurality of posts 14 on the left and a plurality of posts 16 on the fight, spaced apart and supported by lateral support members 18 formed as shown, which may be connected to the post by means of bolts, welding or other means. The first row of ground level bays are generally designated as first bay 20, second bay 22 and third bay 24. The bays are sized to accept a standard pallet and the largest load to be expected. First bay 20 is the front or loading bay, bay 24 is the back storage bay and bay 22 is the middle or intermediate bay. Immediately above the longitudinally extending first row of bays 20, 22 and 24, is a second story row of bays which are only partially shown in FIG. 1. They are elevated immediately above the corresponding first, second and third bays. A fourth bay 26 is above first bay 20, a fifth bay 28 above second bay 22, and a sixth bay 30 above third bay 24. The bays and rack are only partially shown in FIG. 1 so that the drawing would be large enough to show the details. Of course, the posts would all rise to the same height, and the tracks would be the same length as in the first row of bays. Cross-member 18A defines the front and bottom of first bay 20. Cross-member 18$^1$A defines the front and bottom of fourth bay 26. Like cross-members 18B–D provides support for a track structure in second bay 22 and third bay 24. Similarly, cross-members 18$^1$B and 18$^1$C provide support for a track structure in bays 26 and 28 and there would, of course, be another one to provide support in uncompleted sixth bay 30 above third bay 24. There would be at least another unnumbered set of bays in a third row of bays spaced directly above bays 26, 28 and 30 and additional rows of bays above that.

A pair of spaced inwardly facing opposed parallel first tracks 32 and 34, which from the front of the rack are left and right first tracks, are mounted on lateral cross-members 18A, 18B, 18C and 18D. The first tracks are elongated opposed C-shaped channel beams mounted with the web vertical such that the lower flange of the channel beams serves as a rolling wheel flange. Cross-members 18 are preferably C-shaped channel beams, also. Cross-member 18A has the flanges pointed outwardly. The ends of first tracks 32,34 are butted up against the back of the vertical web of cross-member 18A and welded or otherwise fixed thereto. The undersurface of the rolling wheel flanges of first tracks 32,34 rest on the upper flange of cross-members 18B–D, and are mounted thereto. Track 32 has rolling wheel flange 36 and track 34 has rolling wheel flange 38.

A pair of second spaced outwardly facing parallel tracks are preferably fixed to the back of the vertical web of the first tracks as best illustrated in FIGS. 2 and 3. Second track 40 is on the left and second track 42 is on the right. Second tracks 40,42 extend throughout the second bay and may extend a short distance into the first bay on one end and the third bay on the opposite end. They have respective rolling wheel flange surfaces 44 and 46. The first and second tracks are inclined front to rear. The second track is preferably made from an angle welded to the back of the first tracks, with the flanges parallel, to provide rolling surfaces for wheels of carts. Optionally, another angle 48 can be mounted laterally outwardly and adjacent to second track members 40 and 42 as a protective guard for the flanged wheels of a cart running on flanges 44,46.

The configuration of the unique cart arrangement is best seen in FIG. 4. There is a first cart 50 and a second cart 52. Second cart 52 is a U-shaped flat pallet cart having frame 53 with wheels. It has a front 54 which in operational position in the rack is lateral and parallel to cross-members 18. At the outer ends of front 54 are spaced apart sides 56 and 58, 56 being a left side and 58 being a right side. The sides are arms which are laterally spaced apart and fixed at the outer ends of front 54, extending longitudinally toward the rear of the rack. The frame 54,56,58 is an open frame open at the back to define a nesting area 60. The sides or arms 56,58 may be formed of L-shaped angles having a horizontal flange and a vertical flange, the horizontal flanges being arranged with inside edges 62 and 64 which define the sides of open area 60. The upper surfaces of the frame of cart 52 are in the same plane and sized to support a standard pallet thereon.

Cart 52 has an unflanged set of opposed front wheels 66 supported in rolling relation with flanges 36 and 38 as seen in FIG. 2. It has a rear set of ranged wheels 68 which are supported in rolling relation with flanges 44 and 46 of the second track. The wheels may be mounted in a conventional manner. Cart 52 includes a stop 70, preferably made of resilient material, which as seen in FIG. 1, serves as a cushion when cart 52 rolls forward.

First cart 50 has a frame 51 having spaced apart left and fight side beams 72 and 74 with the flanges opposing each other. An intermediate middle beam 76 and the side beams are fixed to a transverse rear beam 78. A transverse angle member 80 is fixed at the front of frame 51. The upper surfaces of beams 72–80 comprise a loading surface designed to support a standard pallet. Cart 50 is provided with a set of unflanged front wheels 80 and a set of unflanged rear wheels 82. Both front and rear sets of wheels on cart 50 are supported in rolling relation on the rolling wheel flanges of first tracks 32,34. The wheels are mounted so that the loading surface is level. The loading surfaces of both cans may contain one or more pallet stops 84 which prevent pallets from sliding with respect to the carts.

The nesting of the carts in stacked vertical relationship provides a low profile configuration to the carts. As may be easily visualized by reference to FIGS. 1, 2 and 4, side members 72,74 of frame 51 on cart 50 are spaced at a width which is slightly narrower than the width between inside edges 62 and 64 of cart 52. If the wheels of cart 50 are held by brackets as shown in FIG. 4, the thickness of the brackets must be taken into account so that cart 50 can roll forward within nesting space 60. Front 80 of cart 50 may have a flat surface 86 which will rest against the rear portion of front 54 of the second cart in the fully nested ready-to-load position.

FIG. 1 shows the operating relationship with the carts mounted in rolling relation on the rails. With reference to the first bay 20, the second cart is in the fully forward position and the first cart is still located in bay 22. In bay 26, the second cart has rolled fully forward within nesting space 60. Stops 90 may be provided at the rear end of first tracks 32,34 so that the first cart can never be pushed back far enough to roll off the tracks. Stops 92 can be provided at the rear of second tracks 40,42 to prevent the rear wheel 68 of the second track from ever being pushed back off the second tracks. Alternately, the second track can be extended the full length of all three bays.

The operation of the three-deep low profile rack system is schematically illustrated in FIGS. 5A-5C. In FIG. 5A, fork truck 94 is shown lowering a standard pallet 96 containing a load 98 onto the loading surface of first cart 50 nested in the first bay. In FIG. 5B, the fork truck is carrying a second pallet 100 which supports a second load 102. Pallet 100 has been pushed against pallet 96 to roll the first can back into the second bay 22 and pallet 100 is being loaded on the loading surface of second can 52. Load 98 is now stored in the second bay 22, and load 102 is stored in first bay 20. In FIG. 5C, a third pallet 104 carrying load 106 has been moved into the first bay 20 pushing back first cart 50 into the third bay and first can 52 into the second bay. Pallet 104 is now lowered directly onto the tracks 32,34 which are spaced to support the pallet. When this operation is completed and the fork truck removed, a pallet and load is stored in each of the first, second and third bays. The operation can be repeated in each of at least a second story and a third story row of bays.

A special wheel construction is best seen in FIG. 3. The flanges 36,38 of the C-shaped channels are most commonly produced with an angled surface 36 and 38. Wheel 80 has an angled outer surface angled to cooperate in rolling relation with the flange 38. Wheel 80 has a rolling axis and a side 108 facing away from the flange, perpendicular to the rolling axis. Internal bearings in wheel 80 surround the rolling axis and support a load-bearing shaft 110 extending from side 108 which can be fixed to a push-back storage rack cart 50. The shaft has an outer portion 112 having threads for a nut 114. The shaft has an outer end portion 116 having facets which can be traversed by an opening in the nut 114 whereby the facets can be used to keep the shaft from turning while turning said nut to connect or disconnect cart 50 to shaft 110 and wheel 80. A similar wheel construction may be used for the other wheels 66 or 82. By reference to FIG. 2, it may be seen that the cooperating angled surfaces of the wheels and first tracks provide a self-centering action because each of the angled surfaces tend to move laterally toward the center, and thus the cart virtually floats in a self-centered position. The cart runs true down the center line of the row of bays. Only one of the sets of wheels is preferably flanged, that being the rear wheels of the lower second cart. The flanges keep the wheels from shifting sideways to such an extent that one of the wheels could fall off the second tracks.

It is contemplated that the invention disclosed here will be especially useful in the grocery industry where the standard pallet is 40" wide×48" deep and an average pallet load is 1800 pounds. The invention is preferably made with inexpensive hot rolled steel shapes. Three inch channel or angle irons can be used for the cans, and they should be selected to support about a 3000 pound pallet. A sample of the rack assembly has been made to support this kind of weight.

The distance from the top of the track to the loading surface of the second cart was about $\frac{3}{4}$", and the distance from the top of the loading surface of the second cart to the top of the loading surface of the higher first cart was about $\frac{3}{4}$", making an overall height of only about 3 inches from the top of the track to the loading surface of the higher first cart. The slope of the tracks was about $\frac{1}{4}$" for each foot of length. The wheel brackets of the front and rear wheels were selected to making the loading surfaces of both cans level for ease of loading and unloading.

If the cart's surfaces are made to run parallel with the tracks, the overall stacked height of the carts can be reduced from about 3 inches to only about 1½ inches, but the carts, of course, would not be level. In comparison, the overall stacked height of the prior art carts where the higher cart must roll over the lower cart would be about 2½ inches higher than the comparable overall height of the new low profile design disclosed herein. Prior art parallel surface cans would be about 4 inches in overall height instead of 1½ inches and about 5½ inches in overall height instead of 3 inches if the cans are made to run level.

I claim:

1. A low profile push-back rack assembly for multiple stacking with efficient use of vertical space, comprising:
   a rack structure having a series of storage bays arranged front to back in sequence, comprising a first bay, a second bay and a third bay;
   first spaced inwardly facing parallel tracks having rolling wheel flanges for wheeled carts mounted in rolling relation with said flanges, said first tracks being inclined from front to rear and extending through said first, second and third storage bays;
   second spaced outwardly facing parallel tracks having rolling wheel flanges for wheeled carts mounted in rolling relation with said flanges, said second tracks being inclined from front to rear and extending through said second bay;
   a first flat pallet can mounted in rolling relation with flanges of the first spaced inwardly facing tracks, being capable of rolling along said tracks for positioning within any of said first, second or third storage bays;
   a second flat pallet cart mounted in rolling relation with flanges of the second spaced outwardly facing tracks, being capable of rolling along said tracks for positioning within said first or second storage bays;
   said second flat pallet cart having an open frame open at the back, having a front and spaced apart sides to define a nesting area within the frame;
   said first flat pallet cart being higher than said second flat pallet cart and narrow enough in the space between the sides of said second cart to nest within the nesting area within said frame so that both of said carts may be positioned in the first storage bay for loading or unloading.

2. The low profile push-back rack assembly of claim 1 wherein the second outwardly facing parallel tracks terminate short of the first inwardly facing parallel tracks.

3. The low profile push-back rack assembly of claim 2 wherein the second outwardly facing parallel tracks terminate short of both ends of the first inwardly facing parallel tracks.

4. The low profile push-back rack assembly of claim 1 wherein the second outwardly facing parallel tracks are carried by the first inwardly facing parallel tracks.

5. The low profile push-back rack assembly of claim 1 wherein the first spaced inwardly facing parallel tracks are opposed. C-shaped channel beams mounted with the web of the channel being vertical, the lower flanges of the channel beam serving as said rolling wheel flanges.

6. The low profile push-back rack assembly of claim 5 wherein the rolling wheel flanges of the second outwardly facing parallel tracks are provided by mounting an angle section along the back of the vertical webs of said channel beams.

7. The low profile push-back rack assembly of claim 1 wherein said first cart comprises a frame supported in rolling relation on said flanges by sets of front and rear wheels rolling on the flanges of said first tracks.

8. The low profile push-back rack assembly of claim 7 wherein the frame of the second flat pallet cart is equipped with sets of front and rear wheels, said second cart being supported in rolling relation with flanges of said first track by front wheels riding on said flanges, said second cart being supported in rolling relation with flanges of said second tracks by said set of rear wheels riding on said flanges whereby said second cart is supported in rolling relation by both of said tracks.

9. The low profile push-back rack assembly of claim 8 wherein the spaced apart sides of the second flat pallet cart are longitudinally extending arms rigidly connected to said front wherein said front comprises a horizontal transverse support and said longitudinally extending arms comprise an angle section having a horizontal web on which a pallet may rest, and a vertical web having said set of rear wheels mounted thereon, said angle section serving as a protective housing over and around said set of rear wheels, one on each arm, and a portion of said second outwardly facing parallel tracks, which tends to serve as protection from dirt or debris which might fall from a pallet.

10. The low profile push-back rack assembly of claim 1 wherein said rack comprises spaced apart vertical posts and horizontal cross members between said posts, said cross members supporting at least one pair of said tracks and being positioned to incline said at least one pair of tracks from front to rear so that said first and second pallet carts tend to roll to the front of the rack for loading.

11. The low profile push-back rack assembly of claim 10 wherein additional horizontal cross members are vertically spaced above cross members located at the front and rear of said first, second and third storage bays to support additional tracks with rolling wheel flanges and additional wheeled carts mounted in rolling relation with said additional tracks to define fourth, fifth and sixth storage bays respectively vertically elevated above said first, second and third storage bays, to define an operating headspace in each storage bay between the upper surface of the first flat pallet cart and the lower surface of said additional horizontal cross members, which provides improved operating headspace for pallets to be placed on said first flat pallet cart by a fork truck, due to the low profile design of the first and second carts whereby the loading surface of the first flat pallet cart is elevated only slightly above the loading surface of the second flat pallet cart.

12. The low profile push-back rack assembly of claim 11 wherein the first flat pallet cart has a loading surface that is elevated only about 0.75 inches or less above the loading surface of the second flat pallet cart.

13. In a push-back rack assembly which comprises a rack having a front bay, an intermediate bay and a back bay arranged in adjacent sequence from front to back, at least one pair of spaced parallel inwardly opposed rolling wheel flanges and one pair of parallel spaced outwardly extending rolling wheel flanges, and first and second wheeled carts mounted in rolling relation with said flanges, said first can having a frame defining a flat pallet surface elevated above said second cart, the improvement in operable combination comprising:

said outwardly extending flanges extending laterally outwardly beyond said inwardly opposed flanges to define an outer track for a rear set of laterally opposed wheels of said second cart, said second can having a U-shaped frame defining a flat pallet surface, the U-shaped frame having a closed front and spaced apart sides, being open at the back to define an open nesting area within the frame for receiving the first cart in nesting relation within the frame so that both of said cans may be positioned in said front bay for sequentially loading a pallet and pushing back said first cart, loading a pallet and pushing back said second cart and said first cart, then pushing back both cans and loading a third pallet upon a support structure in said first bay.

14. The combination of claim 13 wherein the first can has sets of front and rear wheels which roll on the pair of spaced parallel inwardly opposed rolling wheel flanges and the second cart has sets of front and rear wheels mounted on the U-shaped frame so that the front wheels roll on said inwardly opposed flanges and said rear wheels roll on the pair of parallel spaced outwardly extending rolling wheel flanges.

15. The combination of claim 14 wherein the pair of parallel spaced outwardly extending rolling wheel flanges terminate short of the pair of spaced parallel inwardly opposed rolling wheel flanges.

16. The combination of claim 15 wherein the pair of parallel spaced outwardly extending rolling wheel flanges terminate short of both ends of the pair of spaced parallel inwardly opposed rolling wheel flanges.

17. The combination of claim 16 wherein the front of the U-shaped frame has a stop surface which is configured to contact the rack when the second cart is in the most forward position in the front bay, to arrest the second wheeled cart while the rear wheels of said cart remain supported upon the pair of parallel spaced outwardly extending flanges.

18. The combination of claim 16 wherein the pair of parallel spaced outwardly extending rolling wheel flanges include a stop configured to prevent said second wheeled cart from being moved beyond the intermediate bay in the direction of the back bay.

19. A wheel and flange combination for a push-back storage rack cart, comprising:

an elongated flange having an angled rolling surface for supporting a wheel in rolling relation therealong;

a wheel having an angled outer surface, angled to cooperate in rolling relation with said flange, the wheel having a rolling axis and a side facing away from said flange, being perpendicular to the rolling axis;

internal bearings in the wheel surrounding the rolling axis and supporting a load bearing shaft extending from said side which can be fixed to a push-back storage rack cart to be carried along said flange as the wheel rotates on said bearings;

said shaft having an outer portion having threads for a nut which can be used to fix the shaft to said cart to be carried along said flange; and said shaft having an outer end portion having facets which can be traversed by an opening in said nut, whereby said facets can be used to keep the shaft from turning while said nut is tightened or loosened on said shaft thereby facilitating connecting or disconnecting said cart thereto.

20. The wheel and flange combination of claim 19 wherein said flange comprises two of said flanges mounted spaced apart, parallel and facing each other and there are two of said wheels facing away from each other with said shafts fixed to said cart on a common rolling axis, each of said wheels being in rolling relation with one of said tracks whereby said cart is supported on said tracks for rolling therealong without the need for rail car wheel-like flanges on said wheels to prevent the wheels from moving sideways.

21. The wheel and flange combination of claim 19 further including a push-back storage cart for use in a push-back pallet storage assembly.

22. The wheel and flange combination of claim 20 further including a push-back storage cart for use in a push-back pallet storage assembly.

* * * * *

UNITED STATES PATENT AND TRADEMARK OFFICE
CERTIFICATE OF CORRECTION

PATENT NO. : 5,419,444
DATED : May 30, 1995
INVENTOR(S) : Hubert H. Strom

It is certified that error appears in the above-indentified patent and that said Letters Patent is hereby corrected as shown below:

Col. 8, line 41, delete "can" and add -- cart --.

Col. 9, line 6, delete the "." before "C-shaped".

Col. 10, line 10, delete "can" and add -- cart --.

Col. 10, line 17, delete "can" and add -- cart --.

Col. 10, line 22, delete "cans" and add -- carts --.

Col. 10, line 26, delete "cans" and add -- carts --.

Col. 10, line 28, delete "can" and add -- cart --.

Signed and Sealed this

Twenty-second Day of August, 1995

Attest:

BRUCE LEHMAN

*Attesting Officer*  *Commissioner of Patents and Trademarks*